United States Patent [19]

Kozikaro

[11] Patent Number: 5,156,038
[45] Date of Patent: Oct. 20, 1992

[54] CALIBRATION TECHNIQUE FOR A VEHICLE'S DIFFERENTIAL ODOMETER

[75] Inventor: Elisha M. Kozikaro, Chicago, Ill.

[73] Assignee: Motorola, Inc., Schaumburg, Ill.

[21] Appl. No.: 739,035

[22] Filed: Aug. 1, 1991

[51] Int. Cl.$^5$ .............................................. G01C 22/00
[52] U.S. Cl. .............................................. 73/1 D; 73/1 J
[58] Field of Search .......................... 73/1 D, 1 E, 1 J; 235/95 R; 364/565, 560, 561; 324/166, 160

[56] References Cited

U.S. PATENT DOCUMENTS

| | | | |
|---|---|---|---|
| 4,055,750 | 10/1977 | Jellinek | 364/424.02 |
| 4,663,719 | 5/1987 | Matsumoto et al. | 364/444 |
| 4,852,677 | 8/1989 | Okazaki | 180/169 |
| 5,058,023 | 10/1991 | Kozikaro | 364/449 |

FOREIGN PATENT DOCUMENTS 2009171  2/1989  Canada .

Primary Examiner—Michael T. Razavi
Assistant Examiner—Raymond Y. Mah
Attorney, Agent, or Firm—John H. Moore

[57] ABSTRACT

A method for calibrating a differential odometer in a vehicle (10) having a pair of wheels (14, 16) and a pair of associated wheel sensors (18, 24) which generate output pulses as their associated wheels rotate. The method includes driving the vehicle (10) around a path (12) in a first direction (counterclockwise or clockwise), measuring the vehicle's heading change (preferably 360 degrees), and counting the number of pulses generated by each wheel sensor (18, 24) while the path is traversed. Then the vehicle is driven around the same, or a different, path in the opposite direction, again measuring the vehicle's heading change, and counting the number of pulses generated by each wheel sensor (18, 24). The pulse counts, the measured heading changes, and the known distance between the vehicle's wheels, are used to calculate the distance traveled by each wheel per output pulse from its associated wheel sensor.

6 Claims, 3 Drawing Sheets

CALIBRATION TECHNIQUE FOR A VEHICLE'S DIFFERENTIAL ODOMETER

FIELD OF THE INVENTION

This invention pertains to the field of vehicle navigation systems, and particularly to methods of calibrating differential odometers that are used in such systems.

BACKGROUND OF THE INVENTION

A typical differential odometer includes a pair of sensors, one mounted near each rear wheel of a vehicle. Each sensor generates a plurality of output pulses as its associated wheel rotates, and this information is used to compute a dead reckoning position for the vehicle.

To make accurate dead reckoning computations, the wheel sensors should be calibrated. This means that each output pulse from a sensor should correspond to a known distance traveled by its associated wheel.

The conventional method for calibrating wheel sensors requires that an operator drive the vehicle over a straight path, carefully indicating to his navigation system when he comes to the start and finish points on the path. The system can count the number of pulses received from each wheel sensor between the start and finish points, and calculate the distance travelled per pulse for each wheel.

This conventional calibration method is prone to operator errors, and it is not always possible for the operator to find a straight path having a known length with easily discernable start and finish points.

Further, if the path is incorrectly measured, or if the operator did not properly align the vehicle on the path before indicating the start of the path, incorrect calibration may result. Thus, a more reproducible and operator-friendly calibration method is needed.

DESCRIPTION OF THE PREFERRED EMBODIMENT

Figure 1:
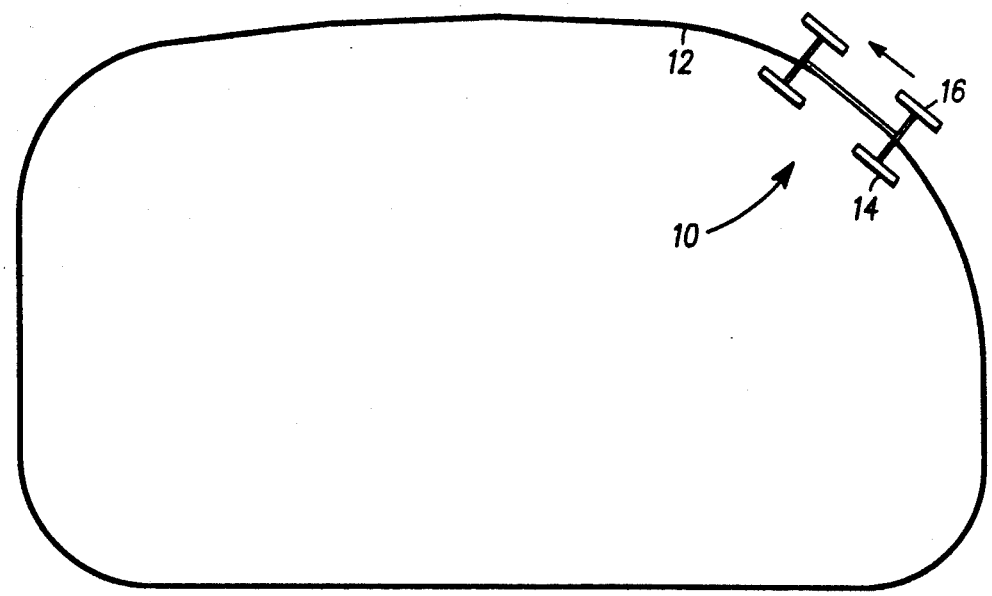
FIG. 1 shows schematically a vehicle being driven around a closed path as part of the calibration method described herein.

Referring to FIG. 1, a vehicle 10 is shown which is moving in a counterclockwise direction around a path 12. Wheel sensors are preferably mounted near its rear wheels for sensing wheel rotation.

Figure 2:
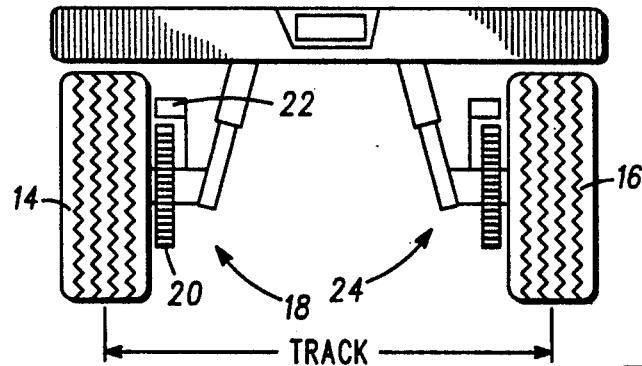
FIG. 2 shows a pair of vehicle wheels and their associated wheel sensors.

Referring briefly to FIG. 2, the vehicle 10 has a left rear wheel 14 and a right rear wheel 16. Associated with the wheel 14 is a wheel sensor 18 that includes a gear tooth 20 that rotates with the wheel 14, and a magnetic pick-up sensor 22. The sensor 22 senses the passage of teeth on the gear 20 and generates an output pulse for each sensed tooth. The right wheel 16 is associated with a similar wheel sensor 24 which also generates output pulses as the wheel 16 rotates. The pulses generated by the wheel sensors 18 and 24 are used for calibration purposes, as described later. The sensors 18 and 24 are part of a conventional differential odometer.

Another piece of information used in the present calibration process is the vehicle "track". The term "track" means the distance between the two wheels which carry the wheel sensors, as indicated in FIG. 2.

Broadly speaking, the present method contemplates that the vehicle 10 be driven around a path in a first direction (e.g., counterclockwise) while the vehicle's heading change $\Delta H1$ is measured and the outputs of the wheel sensors are counted and processed (described more fully below). The vehicle is then driven around the same or a different path in the opposite direction while the vehicle's heading change $\Delta H2$ is measured and the output of the wheel sensors are again counted and processed.

Preferably, each such path is a closed path such as the illustrated path 12, a closed path meaning that completing the path provides a heading change of 360 degrees. However, a path involving a heading change of more or less than 360 degrees (e.g., 270 degrees) may also be used; and the heading change may be different for each direction traversed. Note that the paths need not be circular, regular, or identical to each other.

At the start of the first closed path, electronic apparatus (described below) in the vehicle begins counting and storing the number of pulses generated by each wheel sensor. Upon completion of the path, a count is stored representing the number of pulses generated by each wheel sensor during the drive around the closed path. During the drive around the closed path in the opposite direction, another count is made and stored representing the number of pulses generated by each wheel sensor. Using the stored counts and the known track distance, and also knowing that the heading change for each path is 360 degrees I then calculate the distance travelled per output pulse for each wheel. This information essentially calibrates the pulses from the wheel sensors so that an accurate determination can be made of how far the vehicle has travelled, and its heading changes.

Significantly, the driver need not know or compute the actual distance travelled around either of the paths. As will be apparent from the description below, actual distance travelled is irrelevant. Moreover, the calibration method can be accomplished by driving the vehicle around a city block in one direction, and then driving the vehicle around the same, or a different block, in the reverse direction. The two paths need not be of the same length or shape.

The way in which the present method is preferably implemented will now be described with reference to the electronic apparatus shown in FIG. 3 and the flow chart shown in FIG. 4. With this flow chart, the microprocessor 26 is programmed to instruct the driver to drive the vehicle around clockwise and counterclockwise paths, each path providing a 360 degree heading change.

Figure 3:
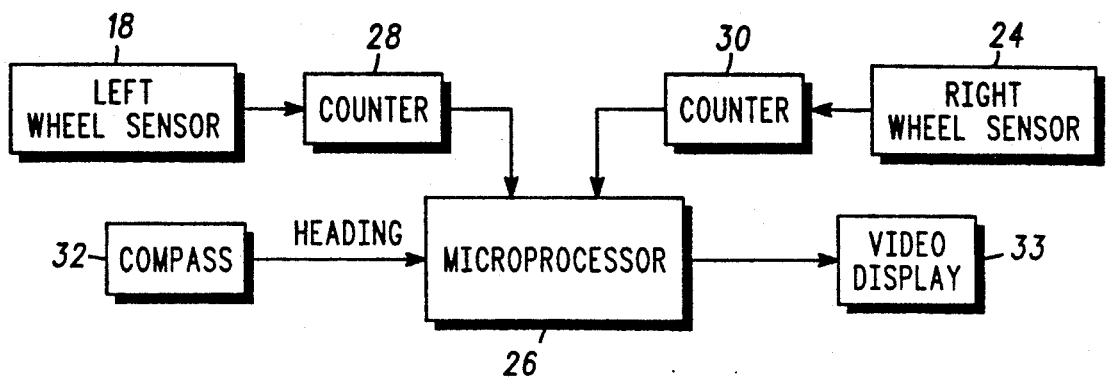
FIG. 3 show electronic apparatus for carrying out the calibration method per this invention.
Figure 4A:
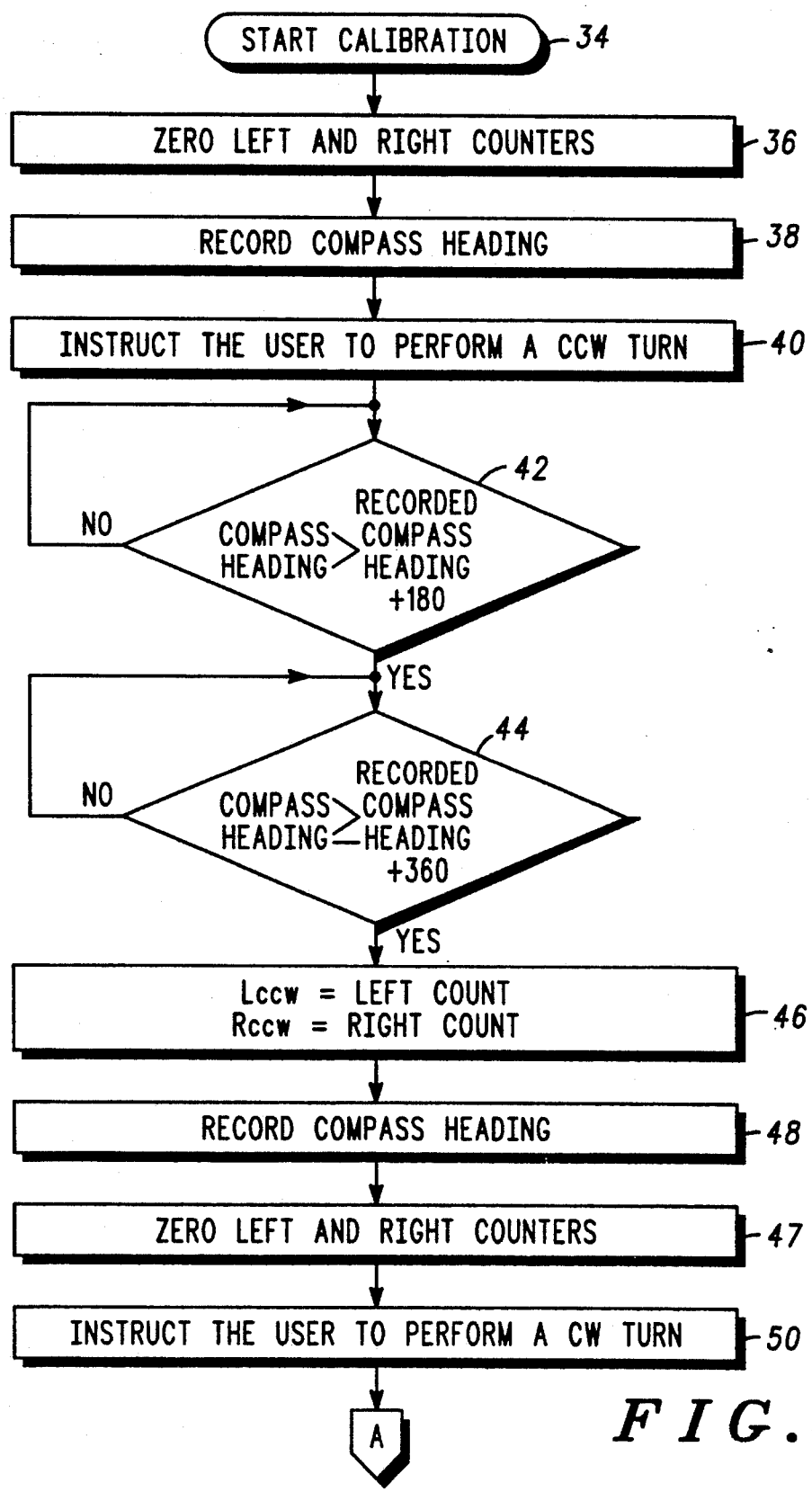
FIGS. 4a and 4b constitute a flow chart showing how the microprocessor of FIG. 3 may be programmed to implement the present invention.
Figure 4B:
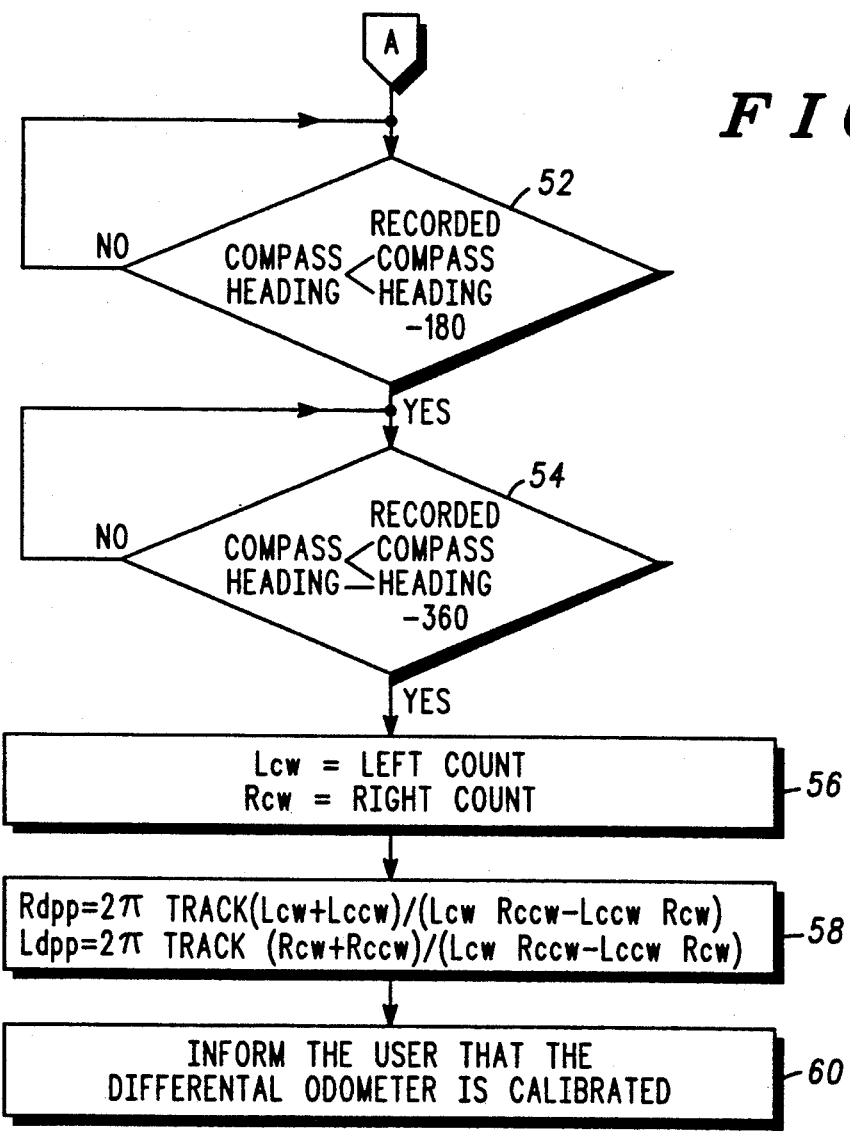

Referring first to FIG. 3, the illustrated apparatus includes a conventional microprocessor 26 that is programmed according to the flow chart shown in FIG. 4 which will be discussed shortly. One input to the microprocessor is from a counter 28 which receives pulses from the left wheel sensor 18 and sends to the microprocessor a signal representing the number of pulses counted. A similar counter 30 inputs to the microprocessor a signal representing the number of pulses received from the right wheel sensor 24.

Another input to the microprocessor conveys information representing the vehicle's heading, as generated by a conventional compass 32, preferably of the flux-gate type. A gyroscope, or any other instrument capable of measuring heading changes, may be used instead of a compass.

A video display 33 is coupled to an output of the microprocessor for instructing the driver as to when to start and stop the calibration process, as will now be described with reference to FIG. 4.

Instruction number 34 initiates the calibration process. The next instruction 36 causes the counters 28 and 30 (FIG. 3) to be set to zero, and the following instruction 38 causes the microprocessor to record the vehicle's compass heading (from compass 32) in its memory.

Instruction 40 advises the user (vehicle operator), via a message on the video display 33, to perform a counterclockwise turn. This means that the operator should now begin to drive the vehicle in a counterclockwise direction around a closed path (e.g. path 12 in FIG. 1). The next instruction 42 asks whether the vehicle's present compass heading is greater than the compass heading recorded per instruction 38, plus 180 degrees. The purpose of this instruction is to effectively ignore any small clockwise and/or counterclockwise turns that could be incorrectly interpreted as having completed the closed path. If the answer to this inquiry is "no", the program loops around instruction 42 until the answer is "yes" and then proceeds to instruction 44. The latter instruction asks whether the vehicle's present compass heading is equal to or greater than the heading recorded in instruction 38 plus 360 degrees. If the answer is "yes", this indicates that the vehicle has completed the first closed loop path.

Next, instruction 46 identifies the left count (i.e., the count attained by counter 28 during the counterclockwise drive around the closed loop path) as Lccw. Similarly, the count attained by the counter 30 during the same drive is identified as Rccw. This completes the necessary inputs from the counterclockwise drive around the closed path.

Instruction 47 now causes the wheel counters 28, 30 to be reset to zero, and instruction 48 causes the vehicle's present compass heading to be recorded. Instruction 50 advises the user (via the video display) to perform a clockwise turn around the same, or a different, closed loop path. Instruction 52 serves the same purpose as previous instruction 42, and instruction 54 determines whether the closed path has been traversed in the clockwise direction. If it has not, the program loops around instruction 54 until the closed path has been traversed. Then instruction 56 labels the count attained by the left counter 28 as Lcw, and the count attained by the right counter 30 as Rcw. The microprocessor now has enough information to calculate (1) the distance travelled by the right wheel per output pulse from right wheel sensor 24, referred to herein as Rdpp; and (2) the distance travelled by the left wheel per output pulse from left wheel sensor 18, referred to herein as Ldpp.

Instruction 58 causes the microprocessor to calculate Rdpp and Ldpp according to the illustrated equations. These equations are based on the fact that the difference in distance travelled by the two wheels 14 and 16 is constant for a 360 degree turn and is equal to $2\pi \times$ Track (see FIG. 2). The distance travelled per pulse (Ldpp and Rdpp) can be calculated by solving the following two equations:

$$2\pi \text{ Track} = \text{Lcw} \times \text{Ldpp} - \text{Rcw} \cdot \text{Rdpp};\quad\quad\quad (A)$$

$$2\pi \text{ Track} = \text{Rccw} \times \text{Rppd} - \text{Lccw} \cdot \text{Ldpp};\quad\quad\quad (B)$$

where
Lccw = left counterclockwise count,
Rccw = right counterclockwise count,
Lcw = left clockwise count, and
Rcw = right clockwise count.

The solutions for Rdpp and Ldpp are shown by the equations in instruction 58.

To summarize briefly, before performing a counterclockwise drive around a closed path, the left and right counters 28, 30 are set to zero. When the drive has been completed, two counts are recorded: Lccw and Rccw. The counters are then reset to zero, and the clockwise drive around a closed path is completed, and the following two counts are recorded: Lcw and Rcw. Using these four counts and the known value for track, Ldpp and Rdpp are calculated per the equations in instruction 58. These calculated values for Ldpp and Rdpp may now be used to provide accurate dead reckoning of the vehicle.

It should be noted that it is not important whether the first closed loop path is traversed in a clockwise direction or a counterclockwise direction. Either direction is permissible so long as the second closed loop path is traversed in the opposite direction.

In the case where the two paths are not "closed" (i.e., do not provide heading changes of 360 degrees), the total heading change $\Delta H1$ developed while traversing the clockwise path is measured and stored, and the total heading change $\Delta H2$ developed while traversing the counterclockwise path is measured and stored. The pulses from the wheel sensors are counted as described above. The equations shown in instruction 58 are solved by substituting $\Delta H1$ (in radians) for $2\pi$ in the equation for Rdpp, and substituting $\Delta H2$ (in radians) for $2\pi$ in the equation for Ldpp.

It will be appreciated that the calibration technique discussed above is easier to perform than conventional techniques that require rather long, straight paths. Such paths may be nonexistent or difficult to find and/or use for the typical driver. This is particularly important where it is desired to calibrate the system on a regular basis to account for changes in tire wear, alignment, tire pressure etc.

Although the invention has been described in terms of a preferred embodiment, it will be obvious to those skilled in the art that many alterations and variations may be made without departing from the invention. Accordingly, it is intended that all such modifications and variations be considered as within the spirit and scope of the invention defined in the appended claims.

What is claimed is:

1. For a vehicle having at least a left wheel and a right wheel separated by a known track distance, and having a differential odometer that includes a wheel sensor associated with each wheel for generating output pulses as its associated wheel rotates, a method of calibrating the differential odometer by finding the actual wheel distance traveled per output pulse, the method comprising:

(a) driving the vehicle around a path in a first direction;

(b) measuring the vehicle's heading change ($\Delta H1$) around the path;

(c) driving the vehicle around a path in a second direction;

(d) measuring the vehicle's heading change (ΔH2) around the path in the second direction;

(e) counting the output pulses generated by each wheel sensor during each drive around the paths; and (f) using the counted pulses, the measured heading changes and the known track distance to calculate the distance travelled per output pulse for each wheel.

2. A method as set forth in claim 1 wherein the vehicle includes a compass, and further including using the compass to determine the vehicle's heading changes on both paths.

3. A method as set forth in claim 2 wherein the first and second paths each comprise a closed path over which the vehicle is driven such that each ΔH is equal to 360 degrees.

4. A method as set forth in claim 1 wherein a drive around one of the paths is completed in a clockwise direction during which the sensor associated with the left wheel generates pulses indicative of a left clockwise count (Lcw) and the sensor associated with the right wheel generates pulses indicative of a right clockwise count (Rcw), wherein a drive around the other closed path is completed in a counterclockwise direction during which the sensor associated with the left wheel generates pulses indicative of a left counterclockwise count (Lccw) and the sensor associated with the right wheel generates pulses indicative of a right counterclockwise count (Rccw), and wherein step (f) includes calculating the left wheel distance travelled per pulse (Ldpp) and the right wheel distance travelled per pulse (Rdpp) according to the following equations:

$$Rdpp = \frac{\Delta H1 \; Track \; (Lcw + Lccw)}{(Lcw \; Rccw - Lccw \; Rcw)}$$

$$Ldpp = \frac{\Delta H2 \; Track \; (Rcw + Rccw)}{(Lcw \; Rccw - Lccw \; Rcw)}$$

where ΔH1 is the vehicle's change in heading in the clockwise direction and ΔH2 is the vehicle's change in heading in the counterclockwise direction.

5. For a vehicle having a compass, at least a left wheel and a right wheel separated by a known track distance, and having a differential odometer that includes a wheel sensor associated with each wheel for generating output pulses as its associated wheel rotates, a method of calibrating the differential odometer by finding the actual wheel distance traveled per output pulse, the method comprising:

(a) instructing the vehicle operator to start driving the vehicle around a first closed path in a first direction;

(b) using the compass to indicate when the vehicle has completed a turn of 360 degrees around the first closed path;

(c) recording the number of output pulses generated by each wheel sensor while driving around the first closed path;

(d) instructing the vehicle operator to start driving the vehicle around a second closed path in a direction opposite to the first direction;

(e) using the compass to indicate when the vehicle has completed a turn of 360 degrees around the second closed path;

(f) recording the number of output pulses generated by each wheel sensor while driving around the second closed path; and (g) using the counted pulses and the known track distance to calculate the distance travelled per output pulse for each wheel.

6. A method as set forth in claim 5 wherein a drive around one of the closed paths is completed in a clockwise direction during which the sensor associated with the left wheel generates pulses indicative of a left clockwise count (Lcw) and the sensor associated with the right wheel generates pulses indicative of a right clockwise count (Rcw), wherein a drive around the other closed path is completed in a counterclockwise direction during which the sensor associated with the left wheel generates pulses indicative of a left counterclockwise count (Lccw) and the sensor associated with the right wheel generates pulses indicative of a right counterclockwise count (Rccw), and wherein step (g) includes calculating the left wheel distance travelled per pulse (Ldpp) and the right wheel distance travelled per pulse (Rdpp) according to the following equations:

$$Rdpp = \frac{2\pi \; Track \; (Lcw + Lccw)}{(Lcw \; Rccw - Lccw \; Rcw)}$$

$$Ldpp = \frac{2\pi \; Track \; (Rcw + Rccw)}{(Lcw \; Rccw - Lccw \; Rcw)}$$

* * * * *